US006823778B2

(12) United States Patent
Fouillet

(10) Patent No.: US 6,823,778 B2
(45) Date of Patent: Nov. 30, 2004

(54) SAFETY DEVICE FOR A PNEUMATIC MEMBRANE PRESS

(75) Inventor: Jacques Fouillet, La Previere (FR)

(73) Assignee: Vaslin Bucher S.A., Chalonnes sur Loire (FR)

(*) Notice: Subject to any disclaimer, the term of this patent is extended or adjusted under 35 U.S.C. 154(b) by 47 days.

(21) Appl. No.: 10/233,617

(22) Filed: Sep. 4, 2002

(65) Prior Publication Data

US 2003/0056664 A1 Mar. 27, 2003

(30) Foreign Application Priority Data

Sep. 4, 2001 (FR) ........................................... 01 11440

(51) Int. Cl.[7] ................................................ F16P 7/00
(52) U.S. Cl. ...................................... 100/347; 100/345
(58) Field of Search ................................ 100/341, 194, 100/345, 347, 349; 210/224, 228, 231

(56) References Cited

U.S. PATENT DOCUMENTS 4,666,596 A * 5/1987 Oelbermann et al. ....... 210/228
5,575,199 A 11/1996 Yamamoto
6,412,668 B1 * 7/2002 Vlooswijk et al. .......... 222/396

FOREIGN PATENT DOCUMENTS

| | | |
|---|---|---|
| CH | 313442 | 4/1956 |
| EP | 0 253 315 | 1/1988 |
| FR | 2348268 | 11/1977 |

* cited by examiner

*Primary Examiner*—Allen Ostrager
*Assistant Examiner*—Shelley Self
(74) *Attorney, Agent, or Firm*—Young & Thompson

(57) ABSTRACT

A safety device for a pneumatic membrane press with door(s) comprises at least one unit for controlled establishment of a leak, each optionally associated with a cooperating opening/door assembly. Each unit includes an actuator module comprising an opening for receiving a key mounted on the door of the press and an actuating member whose position depends on the presence or not of the key in the opening; and a valve module comprising a sealing member for a circulation duct between an aperture in fluid connection with one or more inflation volume(s) pressurised when the press is pressurised and an aperture opening into the open air, the actuating member allowing the closure of the duct by the sealing member when the key is in the receiving opening and forcing the freeing of the duct when the key is not in the opening.

17 Claims, 2 Drawing Sheets

SAFETY DEVICE FOR A PNEUMATIC MEMBRANE PRESS

FIELD OF THE INVENTION

The present invention relates to the safety of people and equipment, in particular in the viticultural field, and concerns a safety device for a membrane press.

BACKGROUND OF THE INVENTION

In presses of the above-mentioned type, materials are pressed by the action of a membrane which is fixed in the tank of the press and which, on the side remote from that being applied to said materials, is subjected to the action of a pneumatic pressure by inflation of the volume which it defines with the corresponding part of the wall of the tank.

On the side in contact with the materials to be pressed, the tank of the press comprises an opening which may be closed by a door, in particular during the pressing phases.

However, the pressures used during these phases are high and may prove dangerous. The same applies to the inflatable joints equipping certain press doors.

In fact, in most current pneumatic presses with a membrane, no device is provided which would prevent the membrane and/or the joint from inflating when the door is not closed. The result thereof could be a breakage and a violent explosion of said membranes or said joints likely to cause considerable material damage or even bodily wounds.

Various protection and safety systems have been proposed which detect the closure of the door and allow or prevent pressurisation.

However, these are not sufficiently reliable as they use sensor members, electric or electronic actuators which may prove faulty and the public authorities have recently put out urgent requests, in particular by regulatory means, on using dependable safety means, reliably preventing the inflation of the membrane and/or the joint of a press when the door thereof is not closed and guaranteeing deflation of the membrane and/or the joint prior to any opening of this door (during or after a pressing phase).

SUMMARY OF THE INVENTION

The present invention aims to provide a solution to the above-mentioned problem, said solution having to be of simple and robust construction and capable of being easily installed on existing presses, at their sites of use.

The present invention therefore relates to a safety device for a pneumatic membrane press.

BRIEF DESCRIPTION OF THE DRAWINGS

The invention will be described in more detail hereinafter with the aid of the description which relates to preferred embodiments of the invention given by way of nonlimiting examples and explained with reference to the accompanying schematic drawings, in which.

DETAILED DESCRIPTION OF THE INVENTION

Figure 1:
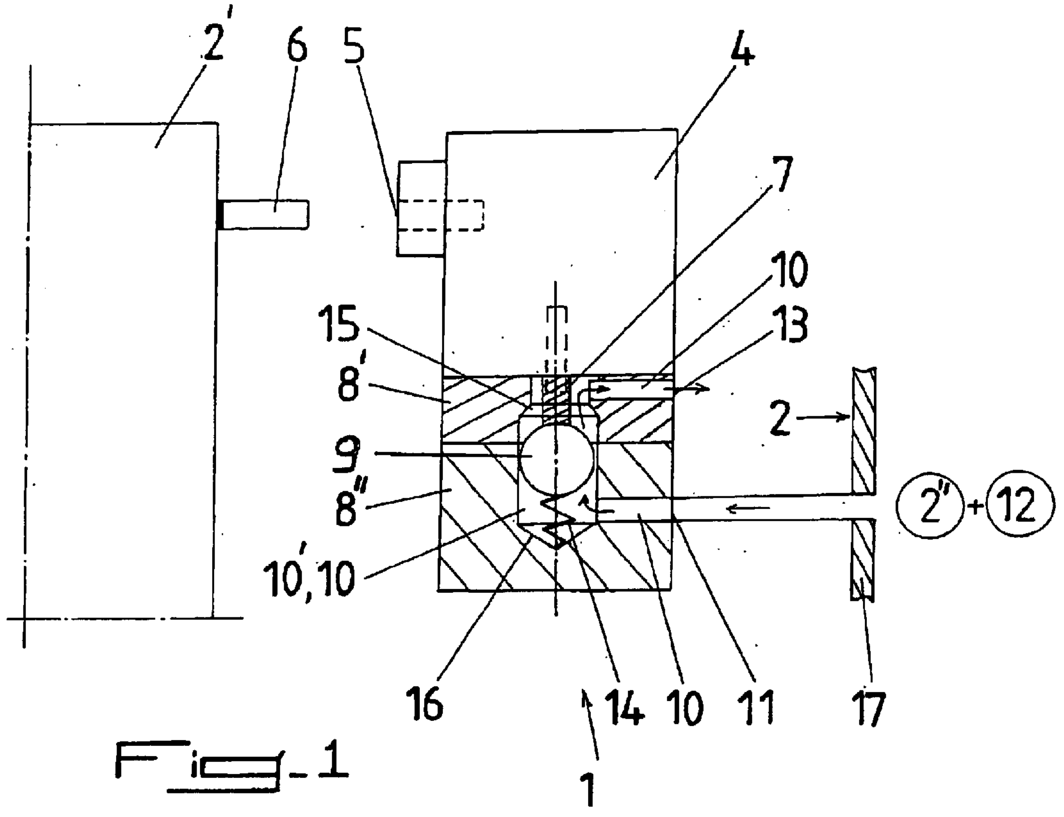
FIG. 1 is a lateral and partial sectional view of a unit for establishing a leak constituting a safety device according to a first embodiment of the invention installed on a membrane press.
Figures 3, 4:
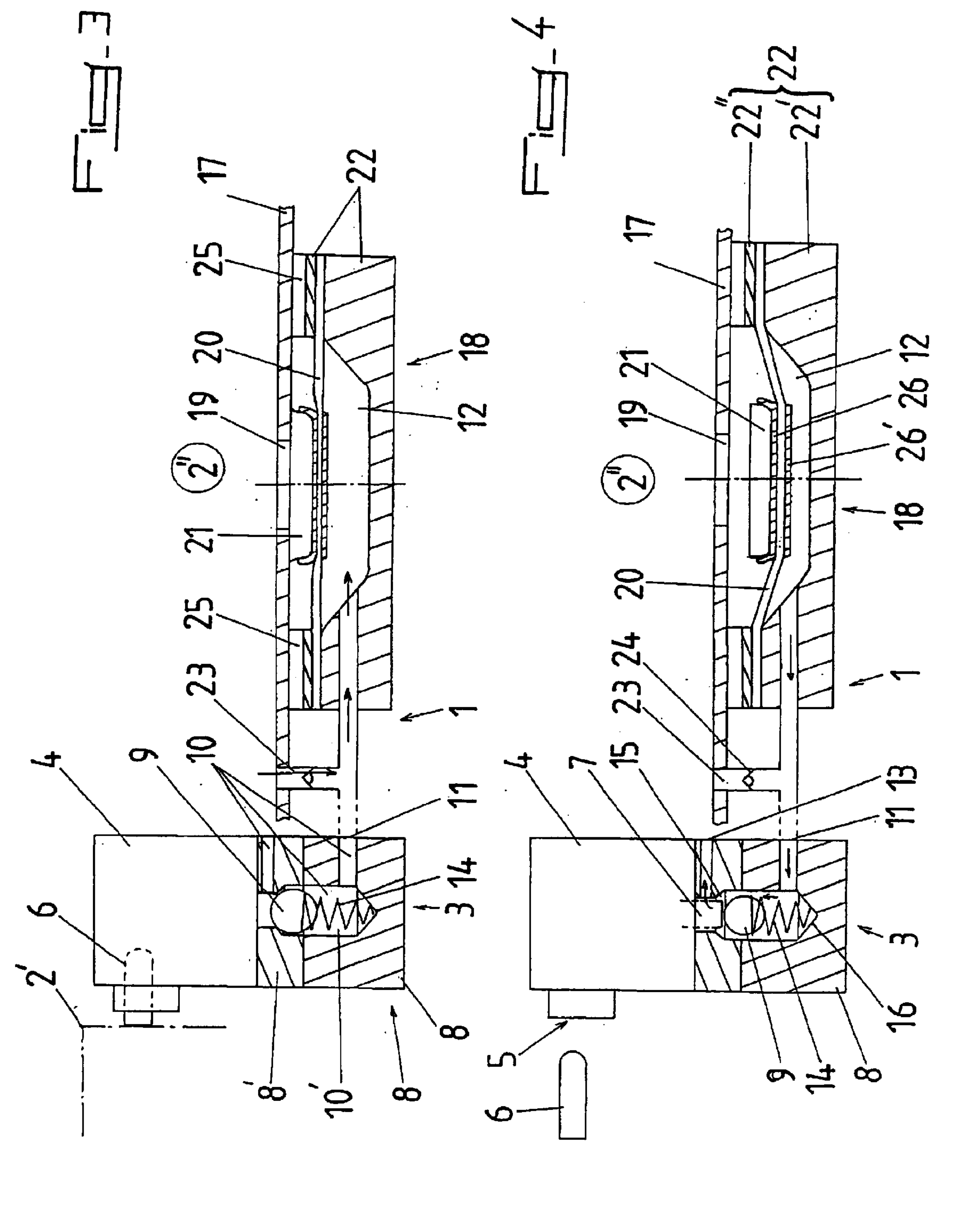

FIGS. 1, 3 and 4 show a safety device 1 for pneumatic presses with a membrane which are provided with at least one opening for the insertion of the materials to be pressed and/or for discharge of the solid pressing residues, closed by a door 2', wherein said device 1 may not allow or maintain pressurisation of said press which has been closed by said at least one door 2'.

According to the invention, said device 1 substantially comprises at least one unit 3 for controlled establishment of a leak, each optionally associated with a cooperating opening/door assembly, each unit 3 consisting, on the one hand, of an actuator module 4 comprising an opening 5 for receiving a key 6 or a similar specific piece mounted on the door 2' under consideration and an actuating member 7, of which the state or position depends on the presence or otherwise of the key 6 in said opening 5 and, on the other hand, of a valve module 8 comprising a sealing member 9 of a circulation duct 10 between an aperture 11 in fluid connection with one or more inflation volume(s) 12 pressurised when the press is pressurised and an aperture 13 opening into the open air, the actuating member 7 allowing the closure of said duct 10 by the sealing member 9 when the key 6 is present or totally engaged, in the receiving opening 5 and forcing the freeing of said duct 10 when the key 6 is not in said opening 5 or is insufficiently engaged in the latter.

The key 6 and the receiving opening 5 and optionally the receiving housing lengthening it in the actuator module 4 may have sections with specific matching shapes, the key 6, moreover, optionally being capable of having one or more reference(s) or indexes allowing its degree of insertion into the opening 5 to be checked.

The door or doors 2' of the press may be of any type, notably, pivoting, sliding, pivoting/sliding or other, the only condition to be checked for the installation of the safety device(s) 1 being that only complete and correct closure of this or these door(s) 2' must correspond to a presence or a given engagement of the key 6 in the receiving opening 5 allowing closure of the duct 10.

According to a first characteristic of the invention leading to a simple and reliable construction and shown, in particular, in FIGS. 1, 3 and 4 of the accompanying drawings, the sealing member 9 is biased into the closure position of the duct 10 by the action of a resilient member 14 and is displaced from said closure position by the action of the actuating member 7.

Of course the sealing organ 9 may have different embodiments such as a mushroom, plate, disc, truncated cone or other, associated with a seat of dimensionally adapted complementary shape.

However, according to an economical and robust embodiment of the invention, the sealing member 9 is in the form of a ball resiliently biased by a compression spring 14 against a seat 15 formed by an annular indent produced in a central portion 10' of the circulation duct 10, forming in cooperation a reverse-lock valve in the direction of the aperture 13 opening to the open air, and the actuating member 7 consists of a stud or a moving lug, which can be displaced in the circulation duct 10 between a retracted position in which it is not in contact with or does not rest on said ball 7 and an opened-out position in which it engages said ball 7 to detach it from said seat 15.

To confer a maximum reliability of functioning to the unit 3 for controlled establishment of a leak, the operational connection between the key 6 and the actuating member 7 of the actuator module 4 is of a mechanical type.

The actuator module may, for example, consist of an actuator of the type known by the designation 3 SE31200XB-Z-C by SIEMENS.

For easy manufacture, the valve module 8 is formed by two partially recessed blocks 8' and 8" each enclosing a part of the circulation duct 10 and one of the two apertures 11, 13 opening therefrom and forming, by assembly, a central portion 10' of said duct 10, comprising a seat 15 for adjusted reception of the sealing member 7 and a support or a bearing surface 16 for the resilient biasing member 14.

The safety device 1 can be produced according to a first embodiment of the invention, to subject the pressurisation of the membrane to a correct closure of one or more door(s) 2' and, in this case, the inflation volume 12, for each safety device 1, corresponds to the internal volume 2" jointly defined by the membrane and a part of the wall 17 of the tank 2 of the press and not receiving the materials to be pressurised, the unit 3 optionally being mounted directly on said tank 2. According to a second embodiment of the invention allowing the pressurisation of the sealing joint of a door 2' for access to the tank to be secured, the inflation volume 12 corresponds to the volume defined by an inflatable joint mounted on the door 2' intended to close the insertion and discharge opening of the press.

In the first above-mentioned variation, the device 1 will therefore control the pressurisation of the tank 2 (inflation of the membrane), while in the second variation it will control the pressurisation of the joint of the door 2', by controlled freeing and sealing of an escape and pressure-relief duct 10, this latter of course also being connectable to the pneumatic feed circuits of said joint or said tank 2.

The person skilled in the art will easily understand that it is also possible to simultaneously produce the two above-mentioned variations and the embodiment described hereinafter on the same press or furthermore, if the sealing joint of the door 2' and the internal volume 2" are connected by a fluid connection, to use the same safety device 1 to control the pressurisation of the joint and the above-mentioned membrane.

Using the above-mentioned unit 3 to directly establish the leak preventing the pressurisation of the joint and/or the membrane is not possible, except to the extent that the necessary flow rate to produce the above-mentioned function is at least equal to the maximum flow rate allowed by the duct 10 in the open or releasing position of the sealing member 9 of the valve module 8.

To allow the invention to be applied to cases which do not respond to the above-mentioned condition, it is advantageously provided, according to a further characteristic of the present invention, that said safety device 1 may also comprise, if necessary, a pneumatic sealing module 18 controlled by the pressure applied during pressurisation of the tank 2 and/or of the door 2' of the press and of which the state is controlled by the unit 3, this module 18 being mounted in the region of an opening or an escape duct 19 in direct connection with the volume(s) of the pressurised joint and/or tank 2, or of the pneumatic feed circuit ensuring that this volume or these volumes are pressurised.

The module 18 substantially comprises a moving piece 20 which is displaced by the pressure becoming established in an inflation volume 12 when the joint and/or tank 2 are pressurised in a sealing position in which the moving piece 20 tightly closes the opening or the escape duct 19 against a return force biasing it in a freeing position.

The moving piece 20 may have various shapes as a function of the site to be sealed, such as, for example, a drawer or a diaphragm to seal a duct, a button with a form which is complementary to that of the opening, a plate superficially sealing the opening or similar, the sealing means optionally available being capable of being carried by said moving piece or mounted in the region of the duct or the opening.

Figure 2:
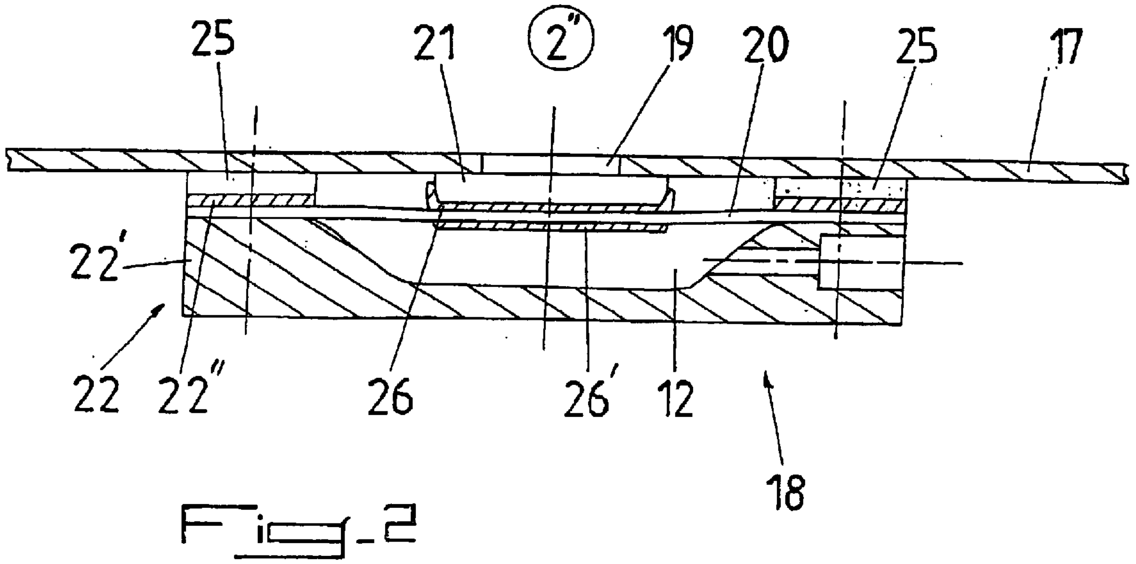
FIG. 2 is a sectional view of a pneumatic sealing module which is part of a safety device according to a second embodiment of the invention, and, FIGS. 3 and 4 are partial sectional views of a safety device according to the second embodiment of the invention, respectively in a state allowing the pressurisation of the press and in a state which does not allow the pressurisation of the latter.

According to an advantageous variation of the invention, shown in FIGS. 2 to 4 of the accompanying drawings, the moving piece 20 is displaced in or against the escape opening 19 to achieve the tight seal thereof, owing to the effect of a thrust force which is at least slightly greater than the recoil force outside or at a distance from the opening 19 generated by the pressure in the joint of the door 2', the tank 2 or their respective pneumatic feed circuit, this difference in strength between thrust and recoil. forces resulting, for example, from a difference in areas of application of the pressure for pressurising the door joint 2' and/or the tank 2.

Said module 18 therefore constitutes a pneumatic operating system which, in terms of dimensions and applied forces amplifies the action produced by the unit 3 for controlled establishment of a leak.

To obtain optimised functioning in terms of safety, apart from the above-mentioned pneumatic component, the return force may also comprise a component of a resilient type or a spring, obtained by cooperation of the moving piece 20 with a biasing member 21 and, if necessary, corresponding support.

According to a preferred embodiment of the invention and as shown in FIGS. 2 to 4 of the invention, the pneumatic sealing module 18 substantially consists, on the one hand, of a flexible and tight membrane 21 carrying a moving piece 20 located facing and close to an escape opening or orifice 19 produced in a part of the wall 17 of the tank 2 which with the membrane defines the internal volume 2" receiving the flow of air for pressuring said press and sealing this orifice 19 tightly by the action of a suitable pressure force, and, on the other hand, by a support plate 22 carrying said membrane 21 and comprising a part which is recessed or in the form of a dome 22' defining, with said membrane 21 and on the side remote from that carrying the piece 20 the inflation volume 12, this latter being pressurised when the press is pressurised by a connection piece 23 equipped with a reverse-lock shutter 24 and tightly connected to the part of the wall 17 of the tank 2 provided with an escape opening 19, said connection piece 23 also being in fluid connection parallel to the aperture 11 of the valve module 8.

Said support plate 22 will also comprise, in particular, a ring or a carrying frame 22" on which is mounted the membrane 21 in the region of its edges.

According to an advantageous construction of the invention, the support plate 22 carrying and covering the membrane 21 is mounted on the external face of the part of the wall 17 of the tank 2 by means of a plurality of mutually spaced fixing and bracing pieces 25, between them defining the communication ducts with the open air. The piece 20 consists of a sealing joint in the form of a plate or disc connected to the membrane 21 by means of a holding piece 26 in the form of a bowl associated with a counterpiece 26' or support washer, these being assembled together and mounted on either side of said membrane 21.

The piece 26 forming the door joint ensures a firm hold of the joint 20 and prevents its premature deformation.

In practice, it should be provided that the escape orifice 19 is dimensioned such that the air discharge rate via this opening or this duct 19 is at least slightly greater than the rate delivered by the source of air ensuring the pressurisation of the press and inflation of the internal inflation volume 2" and/or the pressurisation of the door joint 2' and inflation of its internal volume.

The module 18 can be fixed to the exterior of the wall of the tank 2 by any suitable means (screws, solderings, etc.), by means of the pieces 25.

The operation of the safety device 1 according to the invention, in its constitution in the form of an assembly of unit 3/module 18 will now be described with reference to FIGS. 3 and 4 showing the two possible states of said device when the tank is pressurised as a function of the position of a door 2' equipped with a key 6.

In FIG. 3, the door is closed and the key is inserted in the opening of the actuator module.

In this stage, the stud of the actuator module is in the low position and the ball obstructs the hole of the seat (owing to the return spring) which is connected to atmospheric pressure.

The pressure therefore equalises in the tank and in the draining mechanism (connection piece+duct+inflation volume+connecting conduits). The membrane portion of the sealing module is therefore subjected to a pressure load distributed over its entire surface which is greater than the surface of the escape orifice of the tank. The membrane therefore translates toward the tank and occludes the orifice by means of the joint which it carries. The air cannot escape and the tank may increase in pressure for a possible pressing.

In FIG. 4 the door opens or is open. The key is disengaged from the opening 5 and detaches from the actuator module and this drives the upward movement (exit) of the stud which translates the ball downward detaching it from its seat and freeing the central orifice thereof. At this precise moment the pressure in the draining mechanism balances with the atmospheric pressure as the seal between the ball and its perforated seat is broken.

The pressure of the tank is then greater than the pressure in the draining mechanism (atmospheric pressure) and this implies a recoil, for example, a downward translation, of the membrane portion of the pneumatic sealing module and the joint which it carries. The escape orifice is therefore disengaged and the air escapes via the (dimensioned) hole, then between the braces preventing any inflation and any rise in pressure.

Obviously the invention is not limited to the embodiments described and shown in the accompanying drawings. Modifications remain possible, in particular from the point of view of the design of the various elements or by substitution of equivalent methods, without thus departing from the scope of protection of the invention.

What is claimed is:

1. Safety device for a pneumatic membrane press having at least one inlet for insertion of materials to be pressed or discharge of solid pressing residues, said inlet adapted to be closed by a door, the device comprising:

at least one unit for controlled establishment of a leak;

each unit being associated with a cooperating inlet and door;

each unit including an actuator module comprising an opening for receiving a key mounted on the door under consideration, and an actuating member whose position depends on the presence of the key in said opening;

a valve module comprising a sealing member for a circulation duct between a first aperture in fluid connection with one or more inflation volume pressurized when the press is pressurized, and a second aperture opening into the open air;

the actuating member allowing the closure of said circulation duct by the sealing member, when the key is present or totally engaged in the opening, and forcing the freeing of said duct when the, key is not in said opening or is insufficiently engaged in said opening;

the inflation volume corresponding to an internal volume jointly defined by a membrane and a part of a wall of a tank of the press; and a pneumatic sealing module which is controlled by the pressure applied when the tank is pressurized and whose state is controlled by the unit; said pneumatic sealing module being mounted in the region of an opening of an escape duct in direct connection with the volume of the pressurized tank.

2. The safety device according to claim 1, wherein the sealing member is biased into the closure position of the circulation duct by the action of a resilient member and is displaced beyond said closure position by the action of the actuating member.

3. The safety device according to claim 1, wherein the sealing member is in the form of a ball resiliently biased by a compression spring against a seat formed by an annular indent produced in a central portion of the circulation duct, forming in cooperation a reverse-lock valve in the direction of the second aperture; the actuating member comprising a moving lug, which can be displaced in the circulation duct between a retracted position in which said lug is not in contact with or does not rest on said ball, and an opened-out position in which said lug engages said ball to detach it from said seat.

4. The safety device according to claim 2, wherein the operational connection between the key and the actuating member of the actuator module is mechanical, and the valve module is formed from two partially recessed blocks each enclosing a part of the circulation duct, arid one of the two apertures opening therefrom, and forming, by assembly, a central portion of said duct, comprising a seat suitable for adjusted reception of the sealing member and a bearing surface for the resilient member.

5. The safety device according to claim 1, wherein the unit is mounted directly on the tank.

6. The safety device according to claim 1, wherein the pneumatic sealing module substantially comprises a moving piece which is displaced by the pressure becoming established in an inflation volume when the tank is pressurized in a sealing position in which the moving piece tightly closes the escape duct against a return force biasing said moving piece in a freeing position.

7. The safety device according to claim 6, wherein the moving piece is displaced in or against the escape duct to achieve the tight seal thereof, due to the effect of a thrust force which is at least slightly greater than the recoil force generated by the pressure in the tank.

8. The safety device according to claim 6, wherein the moving piece is displaced in or against the escape duct to achieve the tight seal thereof, due to the effect of a thrust force which is at least slightly greater than the recoil force generated by the pressure in the tank.

9. The safety device according to claim 1, wherein the pneumatic sealing module comprises a flexible and tight membrane carrying a moving piece located facing and close to an escape duct produced in a part of the wall of the tank which with the membrane defines the internal volume receiving the flow of air for pressurizing said press and capable of sealing said escape duct tightly by the action of a suitable pressure force, and a support plate carrying said membrane and comprising a recessed part defining, with said membrane and on the side remote from that carrying the moving piece, the inflation volume; said inflation volume being pressurized when the press is pressurized by a connection piece equipped with a reverse-lock shutter and tightly connected to the part of the wall of the tank provided with the escape duct, said connection piece being in fluid connection parallel to the first aperture of the valve module.

10. The safety device according to claim 9, wherein the support plate carrying and covering the membrane is mounted on an external face of the part of the wall of the tank by a plurality of mutually spaced fixing and bracing pieces between them defining communication ducts with the open air, and said moving piece comprising a sealing joint connected to the membrane by a holding piece associated with a counterpiece assembled together an& mounted on either side of said membrane.

11. The safety device according to claim 1, wherein the escape duct is dimensioned such that the air discharge rate via said escape duct is at least slightly greater than the rate delivered by the source of air ensuring pressurization of the press and inflation of the internal inflation volume.

12. Safety device for a pneumatic membrane press having at least one inlet for insertion of materials to be pressed or discharge of solid pressing residues, said inlet adapted to be closed by a door, the device comprising:

at least one unit for controlled establishment of a leak;

each unit being associated with a cooperating inlet and door;

each unit including an actuator module comprising an opening for receiving a key mounted on the door under consideration, and an actuating member whose position depends on the presence of the key in said opening;

a valve module comprising a sealing member for a circulation duct between a first aperture in fluid connection with one or more inflation volume pressurized when the press is pressurized, and a second aperture opening into the open air;

the actuating member allowing the closure of said circulation duct by the sealing member, when the key is present or totally engaged in the opening, and forcing the freeing of said duct when the key is not in said opening or is insufficiently engaged in said opening;

the inflation volume corresponding to the volume defined by an inflatable joint mounted on the door intended to close the inlet of the press;

a pneumatic sealing module which is controlled by the pressure applied when the inflatable joint of the door of the press is pressurized and whose state is controlled by the unit; said pneumatic sealing module being mounted in the region of the escape duct in direct connection with the volume of the pressurized joint.

13. The safety device according to claim 12, wherein the sealing member is biased into the closure position of the circulation duct by the action of a resilient member and is displaced beyond said closure position by the action of the actuating member.

14. The safety device according to claim 12, wherein the sealing member is in the form of a ball resiliently biased by a compression spring against a seat formed by an annular indent produced in a central portion of the circulation duct, forming in cooperation a reverse-lock valve in the direction of the second aperture; the actuating member comprising a moving lug, which can be displaced in the circulation duct between a retracted position in which said lug is not in contact with or does not rest on said ball, and an opened-out position in which said lug engages said ball to detach it from said seat.

15. The safety device according to claim 13, wherein the operational connection between the key and the actuating member of the actuator module is mechanical, and the valve module is formed from two partially recessed blocks each enclosing a part of the circulation duct, and one of the two apertures opening therefrom, and forming, by assembly, a central portion of said duct, comprising a seat suitable for adjusted reception of the sealing member and a bearing surface for the resilient member.

16. The safety device according to claim 12, wherein the pneumatic sealing module comprises a moving piece which is displaced by the pressure becoming established in an inflation volume when the joint is pressurized in a sealing position in which the moving piece tightly closes the escape duct against a return force biasing said moving piece in a freeing position.

17. The safety device according to claim 16, wherein the moving piece is displaced in or against the escape duct to achieve the tight seal thereof.

* * * * *